(12) United States Patent
Sawazaki et al.

(10) Patent No.: US 10,471,842 B2
(45) Date of Patent: Nov. 12, 2019

(54) ON-VEHICLE STRUCTURE OF POWER CONVERTER

(71) Applicant: TOYOTA JIDOSHA KABUSHIKI KAISHA, Toyota-shi, Aichi-ken (JP)

(72) Inventors: Keisuke Sawazaki, Toyota (JP); Kenshi Yamanaka, Nukata-gun (JP); Hiromi Yamasaki, Toyota (JP); Hitoshi Imura, Chiryu (JP); Akira Saito, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/139,602

(22) Filed: Sep. 24, 2018

(65) Prior Publication Data

US 2019/0152331 A1 May 23, 2019

(30) Foreign Application Priority Data

Nov. 17, 2017 (JP) .................... 2017-221599

(51) Int. Cl.
| | |
|---|---|
| *B60L 15/00* | (2006.01) |
| *H01R 13/707* | (2006.01) |
| *H01R 13/703* | (2006.01) |
| *B60K 6/22* | (2007.10) |
| *B60R 11/00* | (2006.01) |

(52) U.S. Cl.
CPC .............. *B60L 15/007* (2013.01); *B60K 6/22* (2013.01); *H01R 13/707* (2013.01); *H01R 13/7031* (2013.01); *B60R 2011/005* (2013.01)

(58) Field of Classification Search
CPC ..... B60L 15/007; B60K 6/22; H01R 13/7031; H01R 13/707; B60R 2011/005
See application file for complete search history.

(56) References Cited

U.S. PATENT DOCUMENTS

| 7,695,320 B2 * | 4/2010 | Tsukashima | H01R 9/032 439/607.44 |
|---|---|---|---|
| 8,459,399 B2 * | 6/2013 | Ohashi | B60K 1/04 180/312 |
| 2015/0107920 A1 * | 4/2015 | Sakamoto | B60K 1/00 180/65.31 |

FOREIGN PATENT DOCUMENTS

| JP | 2014-179232 A | 9/2014 |
|---|---|---|
| JP | 2017-034910 A | 2/2017 |

OTHER PUBLICATIONS

U.S. Appl. No. 15/939,454.

* cited by examiner

*Primary Examiner* — Zachary Pape
(74) *Attorney, Agent, or Firm* — Oliff PLC

(57) ABSTRACT

An on-vehicle structure of a power converter includes a housing of the power converter mounted on a vehicle, a structure mounted on the vehicle, and a high-voltage connector attached to the housing. The high-voltage connector is configured to apply a voltage exceeding a predetermined threshold voltage, the high-voltage connector is positioned between the housing and the structure such that the high-voltage connector faces the structure in a removal direction of the high-voltage connector when the high-voltage connector is attached to the housing, and in a state where the high-voltage connector is attached to the housing, a length of a portion of the high-voltage connector embedded in the housing is determined so as to be longer than a distance between the high-voltage connector and the structure.

2 Claims, 3 Drawing Sheets

ON-VEHICLE STRUCTURE OF POWER CONVERTER

INCORPORATION BY REFERENCE

The disclosure of Japanese Patent Application No. 2017-221599 filed on Nov. 17, 2017 including the specification, drawings and abstract is incorporated herein by reference in its entirety.

BACKGROUND

1. Technical Field

The present disclosure relates to an on-vehicle structure of a power converter.

2. Description of Related Art

In many cases, an on-vehicle power converter that handles a high-voltage exceeding a predetermined threshold voltage (for example, 100 V) usually includes an interlock mechanism in a connector to which a high-voltage is supplied. A typical power converter is a device that converts the power of a power supply into driving power of a motor for traveling in an electric vehicle or a fuel cell vehicle. The output voltage of the power supply for the motor for traveling exceeds 100 V in many cases. Japanese Unexamined Patent Application Publication No. 2014-179232 (JP 2014-179232 A) and Japanese Unexamined Patent Application Publication No. 2017-034910 (JP 2017-034910 A) disclose examples of an interlock mechanism in an on-vehicle power converter. JP 2014-179232 A discloses an interlock connector that permits or prohibits the flow of current to a connector terminal in accordance with the attachment and detachment of a protective cover covering the connector terminal. JP 2017-034910 A discloses an interlock mechanism in which a part of a low-voltage connector covers a fixing bolt of a high-voltage connector. In the technique of JP 2017-034910 A, the high-voltage connector is configured not to be removed unless the low-voltage connector is removed. The relationship between the low-voltage connector and the high-voltage connector achieves the interlock mechanism.

SUMMARY

In a case where a part for an interlock mechanism is provided, the cost is consequently increased. The technique of JP 2017-034910 A can be implemented at a relatively low cost, however, disposition of two connectors (a low-voltage connector and a high-voltage connector) are restricted. The interlock mechanism with less restrictions on the disposition in the power converter is demanded at a lower cost.

The present disclosure provides an on-vehicle structure of a power converter that achieves a function equivalent to an interlock mechanism. A first aspect of the present disclosure relates to an on-vehicle structure of a power converter including a housing of a power converter mounted on a vehicle, a structure mounted on the vehicle, and a high-voltage connector attached to the housing. The high-voltage connector is configured to apply a voltage exceeding a predetermined threshold voltage. The high-voltage connector is positioned between the housing and the structure such that the high-voltage connector faces the structure in a removal direction of the high-voltage connector when the high-voltage connector is attached to the housing. In a state where the high-voltage connector is attached to the housing, a length of a portion of the high-voltage connector embedded in the housing is longer than a distance between the high-voltage connector and the structure. According to the first aspect of the present disclosure, the on-vehicle structure is configured such that the high-voltage connector cannot be removed unless the power converter (or the structure) is removed from the vehicle. In the on-vehicle structure of the power converter, extra effort of removing the power converter (or the structure) is demanded in order to remove the high-voltage connector. Therefore, unintentional removal of the high-voltage connector is less likely to occur, and it is possible to achieve a function equivalent to the interlock mechanism.

The on-vehicle structure according to the first aspect of the present disclosure may further include a low-voltage connector attached to the housing and configured to apply a voltage lower than the predetermined threshold voltage, in addition to the high-voltage connector to which a voltage exceeding the predetermined threshold voltage is applied. The on-vehicle structure may further include a capacitor disposed inside the housing and configured to be electrically connected to the high-voltage connector, which smooths the current flowing through the high-voltage connector. In this case, even when the power converter is disconnected from the power supply, high-voltage power may be remained in the capacitor. The on-vehicle structure may further include a discharge circuit configured to short-circuit both ends of the capacitor when the low-voltage connector is removed from the housing. A specific example of the discharge circuit is configured to include two terminals which are conducted with the respective electrodes of the capacitor and which are biased towards each other, and an insulating interlock pin extending from the low-voltage connector and sandwiched between the two terminals. When the low-voltage connector is removed, the interlock pin comes out and the two terminals are brought into contact with each other by an elastic force, and the capacitor is discharged. Upon removing the power converter from the vehicle, the high-voltage connector cannot be removed by being obstructed by the structure, but the low-voltage connector can be removed. When the low-voltage connector is removed prior to removing the power converter from the vehicle, the capacitor is discharged and the high-voltage applied to the high-voltage connector is ceased.

Details and further improvements of the present disclosure are described in "DETAILED DESCRIPTION OF EMBODIMENTS" below.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
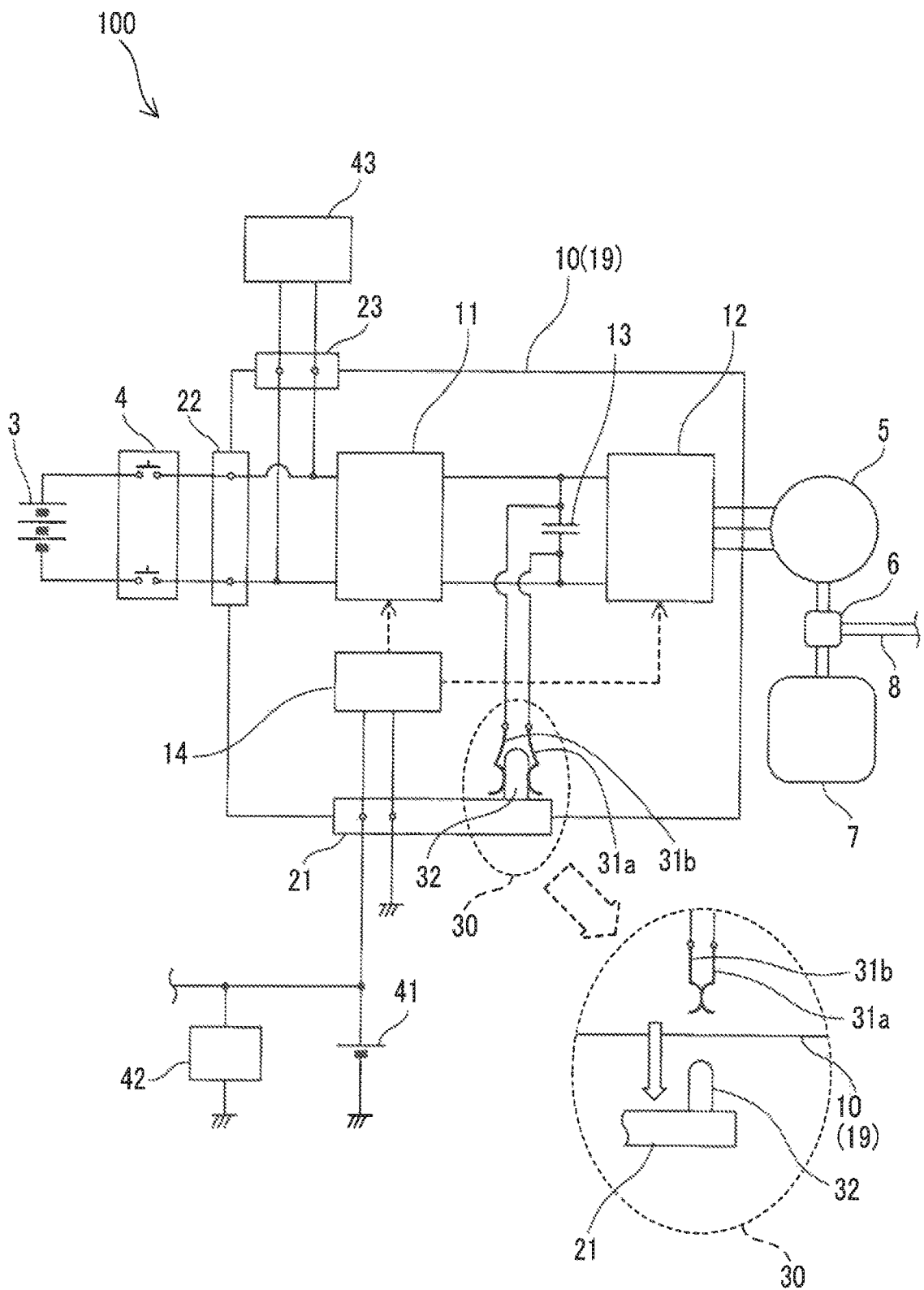
FIG. 1 is a block diagram of a power system of a hybrid vehicle in which an on-vehicle structure according to an embodiment is adopted.

An on-vehicle structure 2 according to an embodiment will be described with reference to the drawings. The on-vehicle structure 2 according to the embodiment is adopted in a power converter 10 of a hybrid vehicle 100. First, a power system of the hybrid vehicle 100 including the power converter 10 will be described. FIG. 1 shows a block diagram of the power system of the hybrid vehicle 100. The hybrid vehicle 100 includes a motor 5 for traveling and an engine 7. The output torque of the motor 5 and the output torque of the engine 7 are combined by a gear set 6 and transmitted to an axle 8.

The hybrid vehicle 100 includes a high-voltage battery 3, a low-voltage battery 41, and the power converter 10. The high-voltage battery 3 is, for example, a lithium ion battery, and the output voltage of the high-voltage battery 3 exceeds a threshold voltage. The threshold voltage is, for example, 100 V. The high-voltage battery 3 is connected to the power converter 10 via a system main relay 4. The system main relay 4 is controlled by a hybrid vehicle (HV) controller (not shown). The HV controller is a device that collectively controls the entire system of the hybrid vehicle 100. When a main switch (ignition switch) of the vehicle is turned on, the HV controller makes the system main relay 4 conductive.

The power of the high-voltage battery 3 is input to the power converter 10 via a power cable and a first high-voltage connector 22. The first high-voltage connector 22 is provided at one end of the power cable and connects the power cable to the power converter 10.

The power converter 10 is a device that converts direct current (DC) power of the high-voltage battery 3 into alternating current (AC) power suitable for driving the motor 5. The power converter 10 includes a voltage converter 11 for stepping up the output voltage of the high-voltage battery 3 and an inverter 12 for converting the step-up DC power into the AC power. A smoothing capacitor 13 is connected in parallel between the voltage converter 11 and the inverter 12. The smoothing capacitor 13 is provided for smoothing the current flowing between the voltage converter 11 and the inverter 12. The power for driving the motor 5 for traveling flows between the voltage converter 11 and the inverter 12, and the power may exceed 100 V and 50 A. In order to deal with the large amount of power as described above, the smoothing capacitor 13 has a large capacity. There are cases where the motor 5 generates power utilizing a kinetic energy of the vehicle. The power (regenerative power) generated by the motor 5 is converted into the DC power by the inverter 12, and further stepped down by the voltage converter 11. The step-down regenerative power is charged to the high-voltage battery 3. The voltage converter 11 is a bidirectional DC-DC converter.

When the high-voltage battery 3 is connected to the power converter 10 via the system main relay 4, at least the voltage of the high-voltage battery 3 is applied to the smoothing capacitor 13. As described above, the smoothing capacitor 13 has the large capacity and continues to store the large amount of power even after the system main relay 4 is shut off.

The voltage converter 11 and the inverter 12 are controlled by a motor controller 14 that is built-in the power converter 10. A dotted line in FIG. 1 indicates the signal line. The motor controller 14 operates by receiving the power supplied from the low-voltage battery 41. The low-voltage battery 41 is a battery that supplies the power to an auxiliary machine in the vehicle, and an output voltage of the low-voltage battery 41 is lower than the threshold voltage stated above. The output voltage of the law-voltage battery 41 is, for example, 12 V. The auxiliary machine is a generic term for devices driven by the voltage of the low-voltage battery 41. For example, a car navigation device 42 falls within a definition of the auxiliary machine, as well as the motor controller 14 of the power converter 10.

The power of the low-voltage battery 41 is input to the power converter 10 via a low-voltage connector 21. A negative electrode of the low-voltage battery 41 and a negative electrode of the auxiliary machine (including the motor controller 14) are connected via a ground. In the hybrid vehicle 100, a conductive body of the vehicle corresponds to the ground.

As described above, the smoothing capacitor 13 is able to hold a large amount of power even after the system main relay 4 is shut off. The power converter 10 includes a discharge circuit 30 that short-circuits and discharges the smoothing capacitor 13 when the low-voltage connector 21 is removed. The discharge circuit 30 includes a first terminal 31a connected to one electrode of the smoothing capacitor 13, a second terminal 31b connected to the other electrode, and an interlock pin 32 provided in the low-voltage connector 21. The interlock pin 32 is made of an insulating resin. As shown in FIG. 1, in a state where the low-voltage connector 21 is attached to the power converter 10, the interlock pin 32 is inserted between the first terminal 31a and the second terminal 31b to separate both terminals from each other. The first terminal 31a and the second terminal 31b are made of a copper plate, have elasticity, and are biased towards each other. The lower right side of FIG. 1 shows a state where the low-voltage connector 21 is removed from the power converter 10. When the low-voltage connector 21 is removed from the housing 19 of the power converter 10, the interlock pin 32 comes out from between the first terminal 31a and the second terminal 31b, and the first terminal 31a and the second terminal 31b are brought into contact with each other by an elastic force. When the first terminal 31a and the second terminal 31b come into contact with each other, both electrodes of the smoothing capacitor 13 are short-circuited, and the smoothing capacitor 13 is discharged.

The housing 19 of the power converter 10 also functions as a power repeater when transmitting the power of the high-voltage battery 3 to an air conditioner 43. A cable connector (a second high-voltage connector 23) coupled to the air conditioner 43 is connected to the housing 19 of the power converter 10. The second high-voltage connector 23 electrically connected to the air conditioner 43 and a first high-voltage connector 22 electrically connected to the high-voltage battery 3 via the system main relay 4 are directly connected inside the housing 19. The power of the high-voltage battery 3 is transmitted to the air conditioner 43 via the first high-voltage connector 22 and the second high-voltage connector 23.

Figure 2:
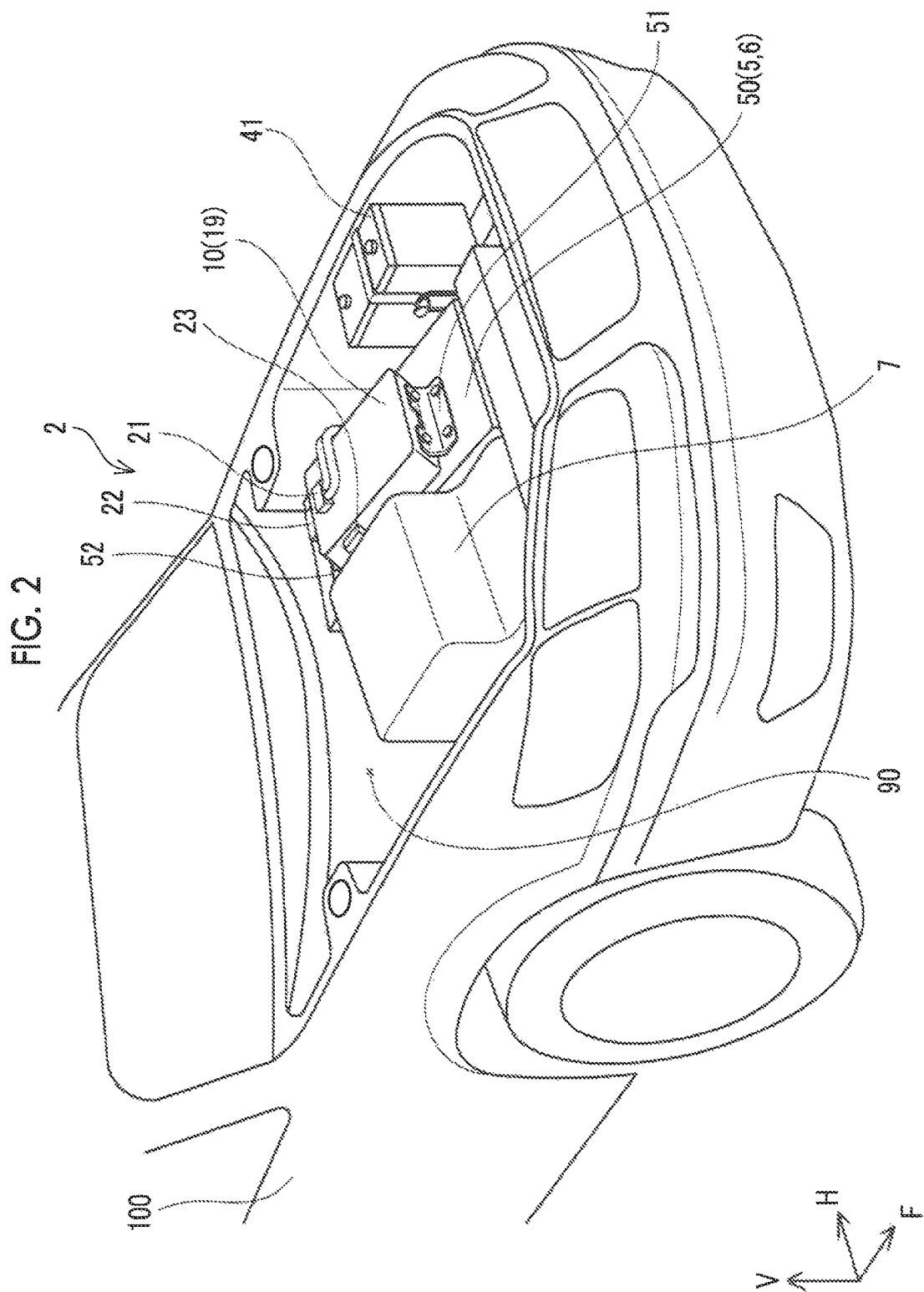
FIG. 2 is a perspective view showing a layout of a power converter in a front compartment.
Figure 3:
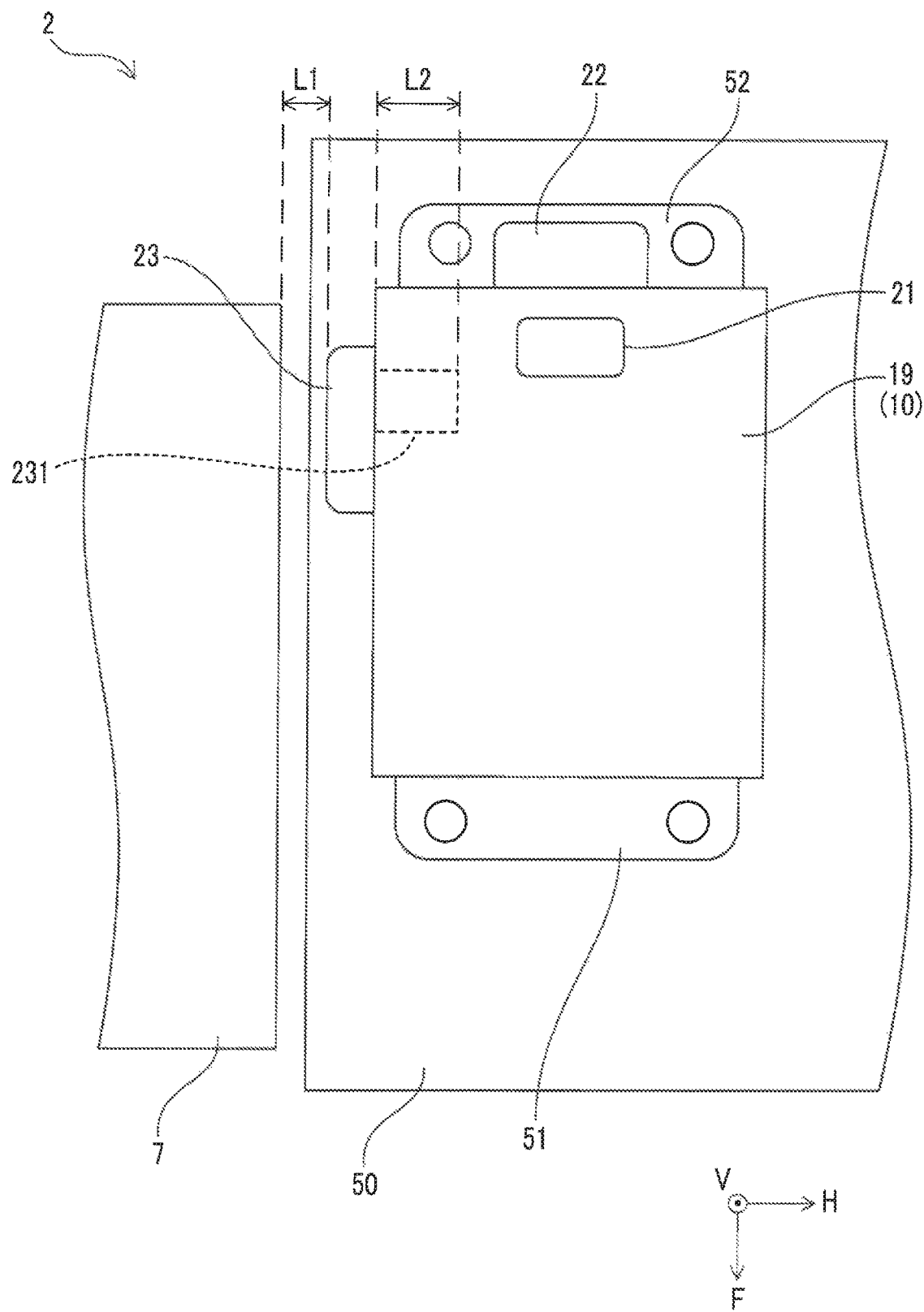
FIG. 3 is a plan view showing an arrangement of the power converter and an engine.

The on-vehicle structure 2 of the power converter 10 will be described. The power converter 10 is mounted on a front compartment 90. FIG. 2 shows a layout of the power converter 10 in the front compartment 90. The positive direction of the F-axis of the coordinate system in the drawing indicates forward of the vehicle, and the positive direction of the V-axis indicates top of the vehicle. The positive direction of the H-axis indicates leftward of the vehicle. FIG. 3 is based on the same definition of each axis in the coordinate system of FIG. 2.

The power converter 10 is supported on a transaxle 50 that accommodates the motor 5 and the gear set 6. The engine 7 is connected to a right side portion of the transaxle 50. The transaxle 50 and the engine 7 are suspended from a pair of side members (not shown).

The power converter 10 is supported with a gap between the power converter 10 and an upper surface of the transaxle 50 by a front bracket 51 and a rear bracket 52. An anti-vibration bush (not shown) is sandwiched between the front bracket 51 and the housing 19 of the power converter 10, and between the rear bracket 52 and the housing 19 of the power converter 10. The front bracket 51, the rear bracket 52, and an anti-vibration bracket suppress vibrations transmitted from the transaxle 50 to the power converter 10.

The low-voltage connector 21 is attached to an upper surface of the housing 19. The first high-voltage connector 22 is attached to a rear surface of the housing 19. The second high-voltage connector 23 is attached to a right side surface of the housing 19. The engine 7 is disposed in the right direction of the housing 19. The second high-voltage connector 23 is attached to a right side surface of the on-vehicle power converter 10 and is removed from the housing 19 by moving the second high-voltage connector 23 to the right side. The engine 7 is disposed on the right side of the second high-voltage connector 23. In other words, the second high voltage-connector 23 is positioned between the housing 19 and the engine 7 such that the second high-voltage connector 23 faces the engine 7 in a removal direction of the second high-voltage connector 23 when the second high-voltage connector 23 is attached to the housing 19.

FIG. 3 is a plan view of the power converter 10 fixed to an upper portion of the transaxle 50. The negative direction of the H-axis of the coordinate system in the drawing (that is, the left side of the drawing) corresponds to the right side of the vehicle. The engine 7 faces the second high-voltage connector 23 in the removal direction of the second high-voltage connector 23. FIG. 3 is a plan view, however, the engine 7 faces the second high-voltage connector 23 even when viewed from the front. The second high-voltage connector 23 has a plug 231 (a connector hood) that is inserted into the housing 19 by a length L2 in an insertion-extraction direction of the connector. The insertion-extraction direction of the connector is a direction of the H-axis of the coordinate system in the drawing. A contactor (an electric terminal) disposed inside the plug 231 and a housing-side socket fitted to the plug 231 are not shown in FIG. 3.

The second high-voltage connector 23 is provided with the plug 231 embedded in the housing 19 by the length L2. On the other hand, a length L1 between the rear surface of the second high-voltage connector 23 and the engine 7 is shorter than the length L2. In other words, the length L2 of a portion (the plug 231) of the second high-voltage connector 23, which is embedded in the housing 19 when the second high-voltage connector 23 is attached to the housing 19, is longer than the distance (the length L1) between the second high-voltage connector 23 and the engine 7 in the insertion-extraction direction of the connector. Therefore, in a state where the power converter 10 is mounted on the vehicle, the second high-voltage connector 23 cannot be removed from the housing 19. In order to remove the second high-voltage connector 23, the power converter 10 needs to be removed from the vehicle body (or the engine 7 needs to be removed from the vehicle body). Upon removing the second high-voltage connector 23, extra effort is needed to remove the power converter 10 or the engine 7 from the vehicle body. Accordingly, when repairing the air conditioner 43 or the like, unintentional removal of the second high-voltage connector 23 in a state where a high-voltage is applied is less likely to occur. The layout (the on-vehicle structure 2) according to the embodiment contributes to suppress unintentionally removal of the second high-voltage connector 23 in a state where a high-voltage is applied. That is, the on-vehicle structure 2 according to the embodiment has a function as an interlock mechanism for suppressing unintentional removal of the second high-voltage connector 23 to which a high-voltage is applied. Removing the power converter 10 from the vehicle body relatively needs extra effort, so that the operator certainly confirms that the power supply is shut off. Therefore, unintentional removal of the second high-voltage connector 23 in a state where a high-voltage is applied is hardly likely to occur.

The power converter 10 includes the smoothing capacitor 13 to which the voltage of the high-voltage battery 3 is applied, and the smoothing capacitor 13 may hold a large amount of power even after the high-voltage battery 3 is shut off from the power converter 10. However, the power converter 10 includes the discharge circuit 30 that discharges the smoothing capacitor 13 when the low-voltage connector 21 is removed. In a case of removing the power converter 10 from the vehicle body, first, the low-voltage connector 21 is removed from the housing 19. When the low-voltage connector 21 is removed, the smoothing capacitor 13 is discharged. Consequently, unintentional removal of the second high-voltage connector 23 in a state where the power of the smoothing capacitor 13 is applied to the second high-voltage connector 23 is hardly likely to occur.

Points to be noted about the embodiment will be described. The structure that obstructs the removal of the second high-voltage connector is not limited to the engine 7. The structure that obstructs removal of the second high-voltage connector may be a part of the body of the vehicle or another on-vehicle device. It may be any structure on the vehicle.

The specific examples of the present disclosure have been described in detail above, however, these are merely illustrative and do not limit the scope of the claims. The techniques described in the claims encompass various changes and modifications of the specific examples exemplified above. The technical elements described in the specification or the diagrams exhibit technical usefulness individually or in various combinations, and are not limited to combinations described in the claims at the time of filing. The techniques exemplified in the specification or the diagrams may achieve a plurality of purposes at the same time, and have technical usefulness by achieving one of the purposes.

What is claimed is:

1. An on-vehicle structure of a power converter, the on-vehicle structure comprising:
   a housing of the power converter mounted on a vehicle;
   a high-voltage connector attached to the housing and configured to apply a voltage exceeding a predetermined threshold voltage; and
   a structure mounted on the vehicle separate from the housing, the structure being positioned to obstruct removal of the high-voltage connector from the housing,
   wherein the high-voltage connector is positioned between the housing and the structure such that the high-voltage connector faces the structure in a removal direction of the high-voltage connector when the high-voltage connector is attached to the housing, and
   in a state where the high-voltage connector is attached to the housing, a length of a portion of the high-voltage connector embedded in the housing is longer than a distance between the high-voltage connector and the structure.

2. The on-vehicle structure according to claim 1, further comprising:

a low-voltage connector attached to the housing and configured to apply a voltage lower than the predetermined threshold voltage;
a capacitor disposed inside the housing and configured to be electrically connected to the high-voltage connector; and
a discharge circuit configured to short-circuit both ends of the capacitor when the low-voltage connector is removed from the housing.

* * * * *